United States Patent
Zeiner et al.

(10) Patent No.: US 7,533,697 B2
(45) Date of Patent: May 19, 2009

(54) FUEL VALVE ASSEMBLY

(75) Inventors: Robert W. Zeiner, Torrington, CT (US); Robert W. Carlson, Southington, CT (US)

(73) Assignee: Parker-Hannifin Corporation, Cleveland, OH (US)

(*) Notice: Subject to any disclaimer, the term of this patent is extended or adjusted under 35 U.S.C. 154(b) by 560 days.

(21) Appl. No.: 10/972,182

(22) Filed: Oct. 22, 2004

(65) Prior Publication Data

US 2005/0087246 A1    Apr. 28, 2005

Related U.S. Application Data

(60) Provisional application No. 60/513,499, filed on Oct. 22, 2003.

(51) Int. Cl.
*B63J 5/00* (2006.01)
*F16K 11/10* (2006.01)

(52) U.S. Cl. .................... 137/899.2; 137/266; 137/607; 251/129.03

(58) Field of Classification Search ................. 137/899, 137/899.02, 266, 607; 251/129.03, 251
See application file for complete search history.

(56) References Cited

U.S. PATENT DOCUMENTS

| | | | |
|---|---|---|---|
| 2,164,232 A | 6/1939 | Downey | 277/60 |
| 3,078,872 A | 2/1963 | Algino | 137/605 |
| 4,178,768 A | 12/1979 | Pauliukonis | 62/160 |
| 4,231,399 A | 11/1980 | Pauliukonis | 137/625.4 |
| 4,286,624 A | 9/1981 | Clausen et al. | 137/625.19 |
| 4,348,917 A * | 9/1982 | Gardner et al. | 251/251 |
| 4,396,037 A * | 8/1983 | Wilcox | 137/625.65 |
| 4,682,629 A | 7/1987 | Deininger | 137/625.4 |
| 4,828,220 A | 5/1989 | Hashimoto | 251/129.06 |
| 4,852,892 A | 8/1989 | Reid | 280/834 |
| 4,899,786 A | 2/1990 | Morris et al. | 137/637.05 |
| 4,971,106 A | 11/1990 | Tsutsui et al. | 137/606 |
| 5,287,841 A | 2/1994 | Forsythe et al. | 123/510 |
| 5,443,093 A * | 8/1995 | Stoll et al. | 137/596.17 |
| 5,485,869 A * | 1/1996 | Haynes | 137/625.65 |
| 5,597,009 A | 1/1997 | Scherrer et al. | 137/375 |
| 5,634,422 A | 6/1997 | Kobayashi et al. | 114/270 |
| 5,636,654 A | 6/1997 | Helm | 137/15 |
| 5,921,263 A | 7/1999 | Negley, III | 137/3 |
| 5,960,809 A | 10/1999 | Keller | 137/12 |
| 6,508,265 B1 | 1/2003 | Bertouille et al. | 137/256 |
| 6,789,568 B1 | 9/2004 | Bunnell et al. | 137/527.8 |
| 6,799,562 B2 | 10/2004 | Pratt et al. | 123/514 |
| 6,845,782 B2 * | 1/2005 | Osterkil et al. | 137/1 |
| 2003/0000587 A1 * | 1/2003 | Sulzye et al. | 137/636.1 |

* cited by examiner

*Primary Examiner*—John Fox
(74) *Attorney, Agent, or Firm*—Renner, Otto, Boisselle & Sklar

(57) ABSTRACT

A valve assembly (10) comprises a valve body (20), a first valve (22a), a second valve (22b), and a manual override device (24). The valve body (20) defines a first inlet (30a), a second inlet (30b), and an outlet (32). Each valve (22a/22b) includes a plunger (68a/68b) that is electrically movable between a position whereat the corresponding inlet (30a/30b) communicates with the outlet (32) and a position whereat the inlet (30a/30b) is sealed from the outlet (32). The override device (24) is manually movable to override positions whereat the electrical control of one of the valves (22a/22b) is overridden and the plunger's seat-sealing surface (72a/72b) is caused to move so that the corresponding inlet (30a/30b) communicates with the outlet (32).

6 Claims, 13 Drawing Sheets

FUEL VALVE ASSEMBLY

RELATED APPLICATION

This application claims priority under 35 U.S.C. §119(e) to U.S. Provisional Patent Application No. 60/513,499 filed on Oct. 22, 2003 and entitled "Marine Fuel Diverting Valve." The entire disclosure of this provisional application is hereby incorporated by reference.

FIELD OF THE INVENTION

This invention relates generally, as indicated, to a fuel valve assembly and, more particularly, to a valve assembly for use in a fuel feed system having a first fuel tank and a second fuel tank which each contain fuel for supply to a fuel-consuming component, such as an engine.

BACKGROUND OF THE INVENTION

A boat with a propulsion engine will often incorporate a fuel feed system comprising two fuel tanks which each contain fuel for supply to the engine. Such a two-tank fuel feed system facilitates a weight-balanced and streamlined vehicle, as the fuel tanks can be substantially symmetrically located, and the engine can be substantially centrally located, relative to the longitudinal axis of the boat's hull. The supply of fuel from the respective tanks can depend upon many factors, including the boat model and/or the operator's preference. In some situations, it may be best to supply fuel simultaneously from both of the fuel tanks to maintain substantially the same level (and thus weight) in the tanks. In other situations, it may be better to provide fuel sequentially from one fuel tank (until it is empty) and then the other, and/or intermittently from each of the two tanks.

SUMMARY OF THE INVENTION

The present invention provides a valve assembly that can be electrically controlled to supply fuel simultaneously, sequentially, intermittently, or otherwise from two fuel tanks.

More particularly, the present invention provides a valve assembly comprising a valve body defining a first inlet, a second inlet, and a common outlet. A first valve comprises a plunger which is electrically movable between a position whereat the first inlet communicates with the outlet and a position whereat the inlet is sealed from the outlet. A second valve comprises a plunger which is electrically movable between a position whereat the second inlet communicates with the outlet and a position whereat the inlet is sealed from the outlet. The electrical control of the valves can be coordinated to simultaneously, sequentially, and/or intermittently establish communication between the inlets and the common outlet.

The valve assembly can additionally comprise an override device manually movable to a first override position, whereat the first inlet communicates with the common outlet, and to a second override position, whereat the second inlet communicates with the outlet. The override device can comprise a cam within the valve body which causes at least the seat-sealing surface of the first plunger to move away from a first valve seat in the first override position and causes at least the seat-sealing surface of the second plunger to move away from a second valve seat in the second override position. This movement can be accomplished by the cam engaging a projection extending from the sealing head of the respective plunger.

The valve assembly can be used with a fuel feed system comprising a first fuel tank, a second fuel tank, and a fuel-consuming component. A supply line from the first fuel tank would be connected to the first inlet, a supply line from the second fuel tank would be connected to the second inlet, and a supply line to the fuel-consuming component would be connected to the common outlet. If the fuel feed system is used on a boat, the first and second fuel tanks can be substantially symmetrically located, and the fuel-consuming component (e.g., a propulsion engine) can be substantially centrally located, relative to the longitudinal axis of the hull.

The valve assembly can additionally or alternatively comprise a return inlet, a first return outlet, and a second return outlet, with corresponding valves to open/close the communication between the inlet and the respective outlets. When used in a fuel feed system, a return line from the fuel-consuming component would be connected to the return inlet, a return line to the first fuel tank would be connected to the first return outlet, and a return line to the second fuel tank would be connected to the second return outlet. The manual override device can be designed to establish communication between the return inlet and the first return outlet in the first override position and to establish communication between the return inlet and the second return outlet in the second override position.

The valve assembly of the present invention preferably incorporates normally-closed solenoid valves. To this end, the plungers can be mechanically biased (e.g., spring biased) to the position whereat inlet-outlet communication is prevented. (Fuel pressure can also assist in maintaining the valves in the closed condition.) The valves each can include a solenoid portion which, when energized, overcomes the biasing force and moves the respective plunger to the position whereat the respective inlet communicates with the common outlet. Thus, in the absence of electrical power, the valves will remain in a closed condition whereby there is a fail safe positive fuel shutoff in the event of a power loss. The manual override device allows an equipment (e.g., boat) operator the ability to maintain a flow of fuel when there is a loss of electrical power to one or all of the valves.

These and other features of the invention are fully described and particularly pointed out in the claims. The following description and annexed drawings set forth in detail certain illustrative embodiments of the invention, these embodiments being indicative of but a few of the various ways in which the principles of the invention may be employed.

DRAWINGS

Figure 11:
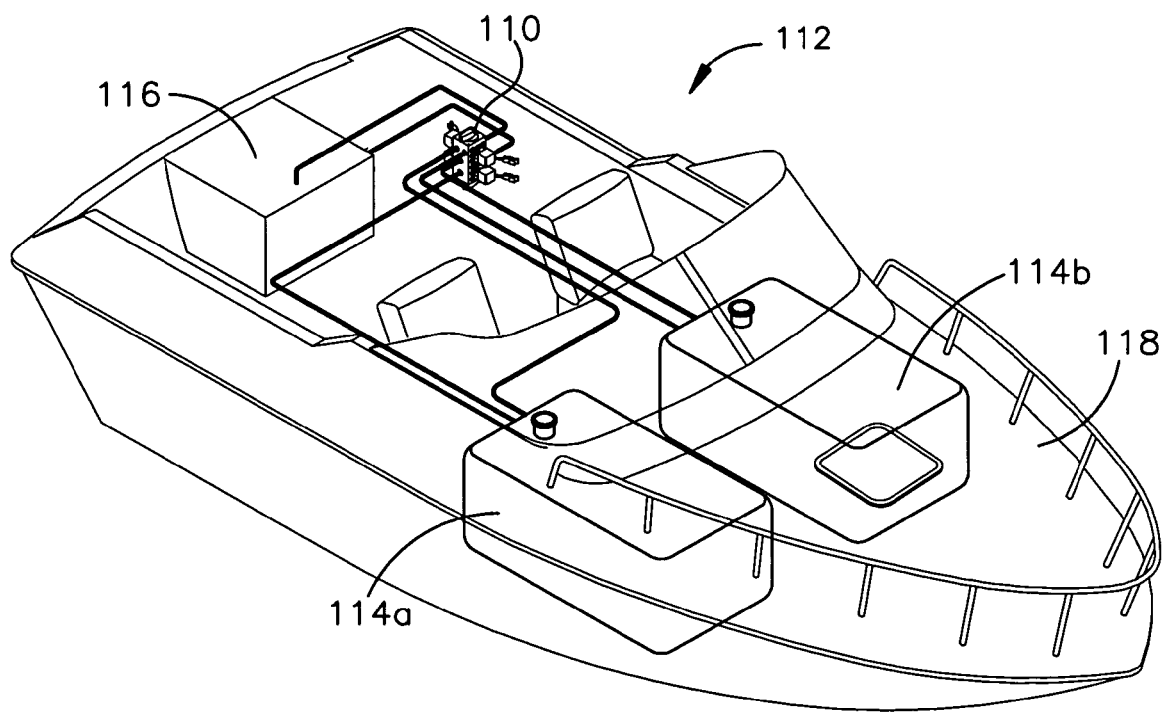

FIG. 11 of another fuel valve assembly 110 according to the present invention being shown in a fuel feed system in a boat.

FIGS. 12-15 are front, top, bottom, and side views, respectively, of the valve assembly 110.

Figure 14:
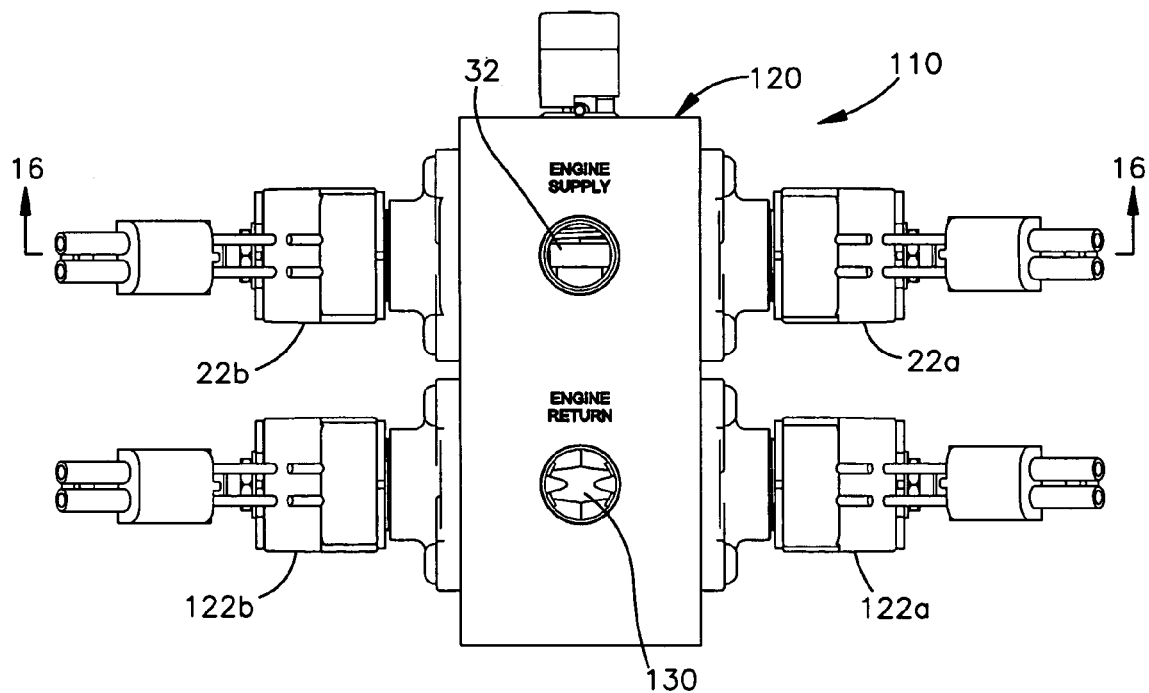
Figure 16:
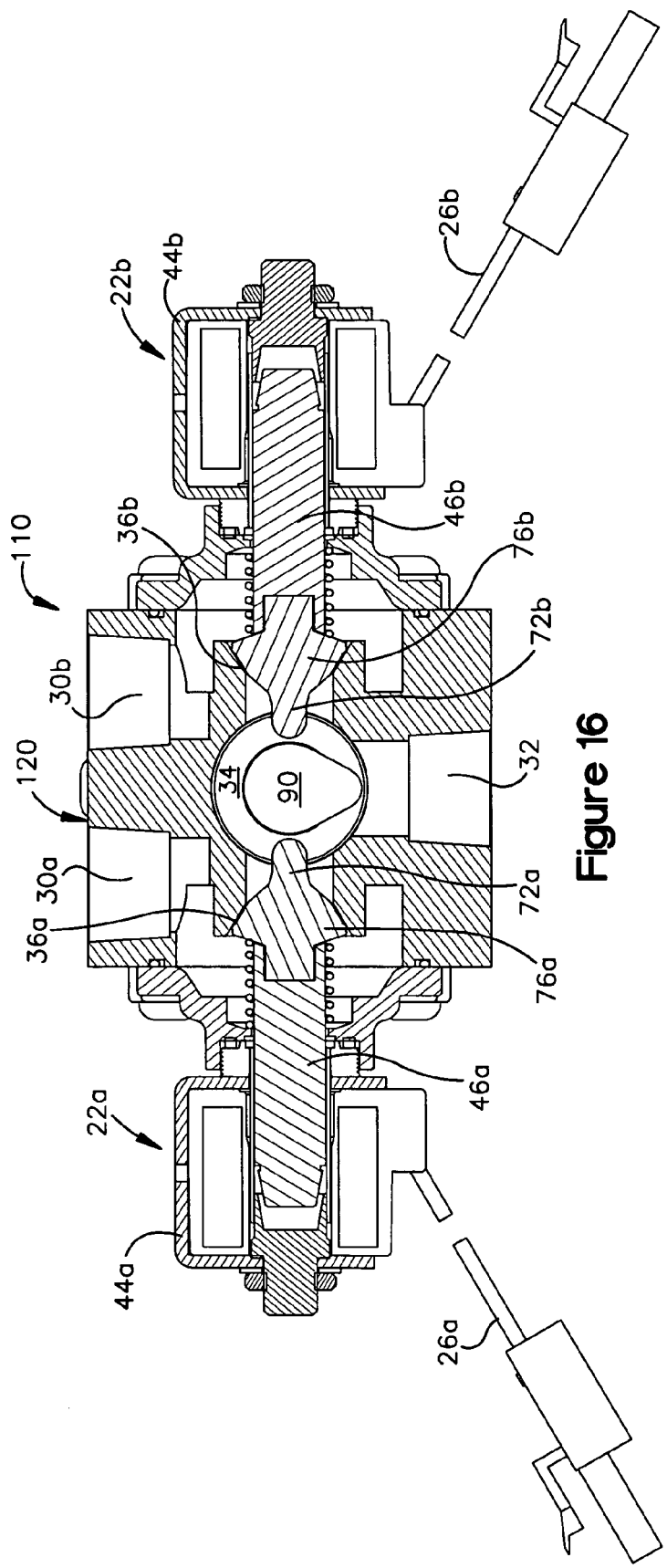

FIG. 16 is a sectional view of the valve assembly 110 as seen along line 16-16 in FIG. 14.

Figure 15:
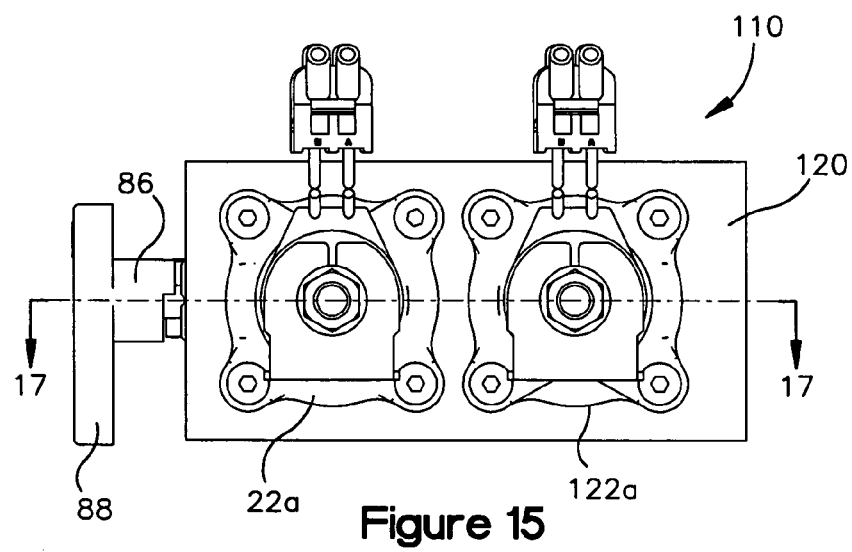
Figure 17:
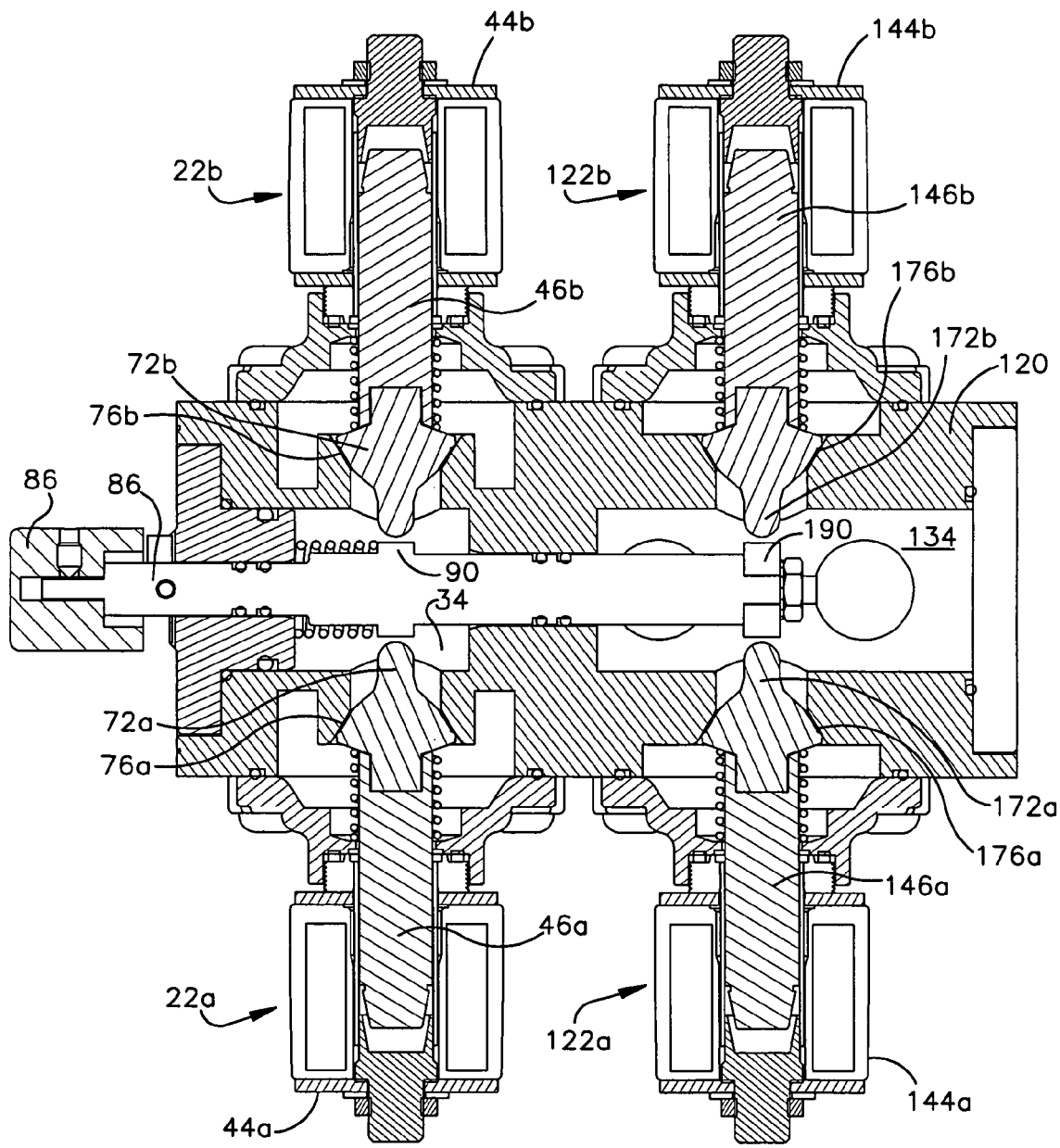

FIG. 17 is a sectional view of the valve assembly 110 as seen along line 17-17 in FIG. 15.

DETAILED DESCRIPTION

Figure 1:
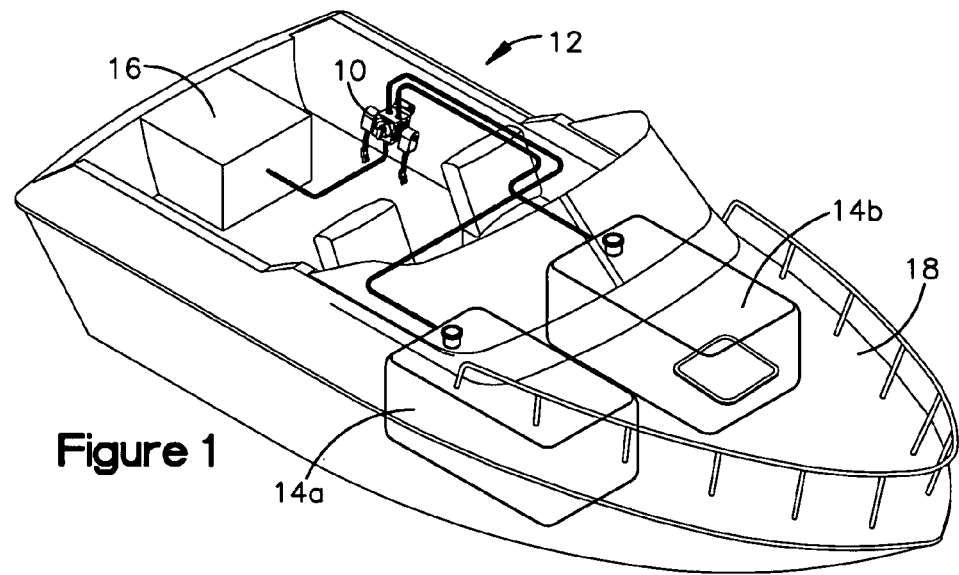
FIG. 1 is a perspective view of a fuel valve assembly 10 according to the present invention, the assembly being shown in a fuel feed system in a boat.
Figure 2:
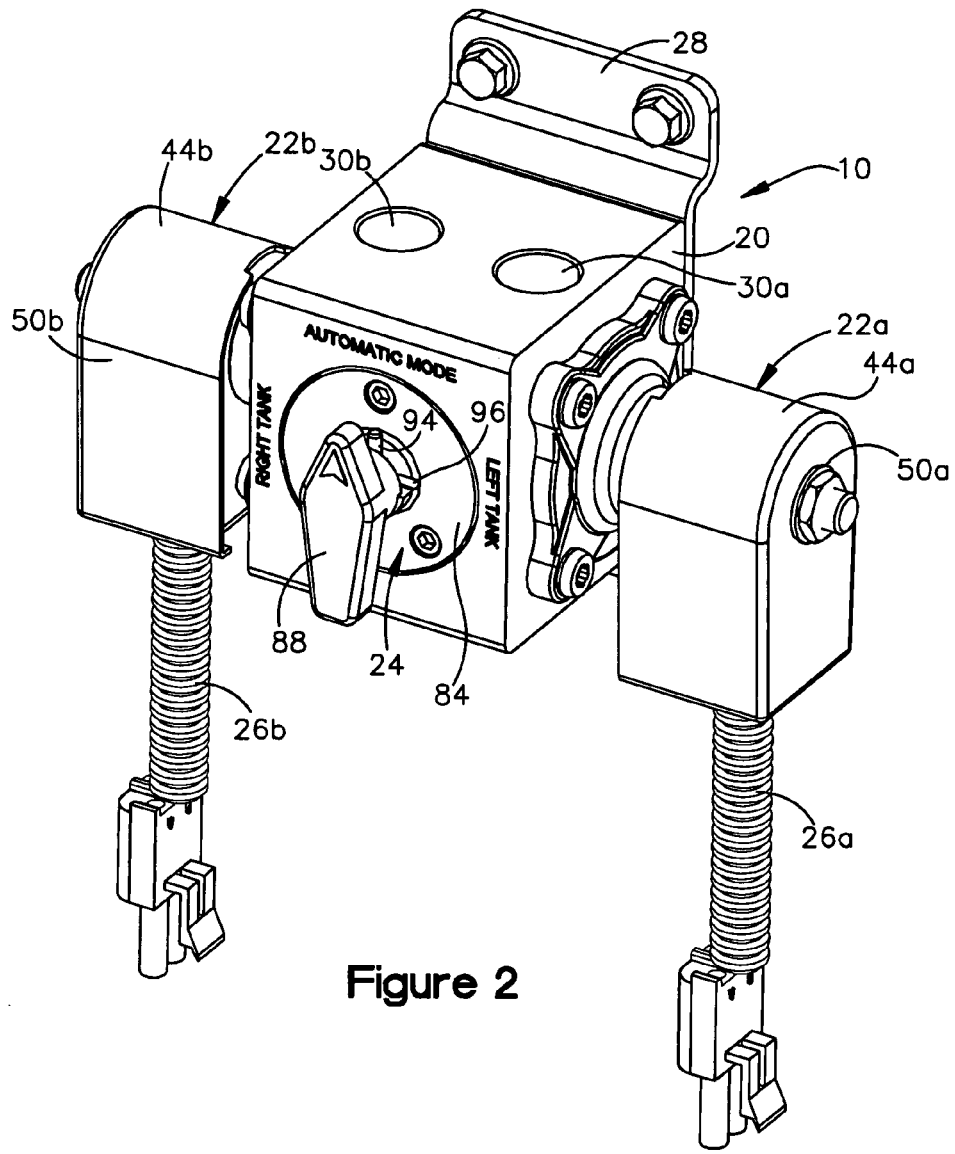
FIG. 2 is a perspective view of the fuel valve assembly 10.

Referring now to the drawings, and initially to FIG. 1, a fuel valve assembly 10 according to the present invention is shown. The valve assembly 10 is shown as part of a fuel feed system 12 further comprising a first fuel tank 14a, a second fuel tank 14b, and a fuel-consuming device 16 (e.g., a propulsion engine). The fuel feed system 12 is used on a boat 18, with the relatively-heavy engine 16 being located centrally relative to a longitudinal axis of the hull and the fuel tanks 14a/14b being symmetrically placed on either side thereof. As is explained in more detail below, the valve assembly 10 can be electrically controlled to supply fuel simultaneously, sequentially, intermittently or otherwise, from the two fuel tanks 14a and 14b. This electrical control can be provided, for example, via automatic circuits tied to the engine ignition and/or manual selection switches on the boat's dashboard.

Referring now additionally to FIGS. 2-8, the fuel valve assembly 10 is shown isolated from the rest of the fuel feed system 12. The valve assembly 10 comprises a valve body 20, a first valve 22a, a second valve 22b, and a manual override device 24. (FIGS. 2-5). The valves 22a and 22b are electrically activated and, to this end, the assembly 10 can include cabled connections 26a and 26b for supplying electricity thereto. (FIGS. 3, 4, 7 and 8). The valve body 20 can be mounted to a supporting wall or other appropriate structure with a bracket 28. (FIGS. 4-7.)

Figure 3:
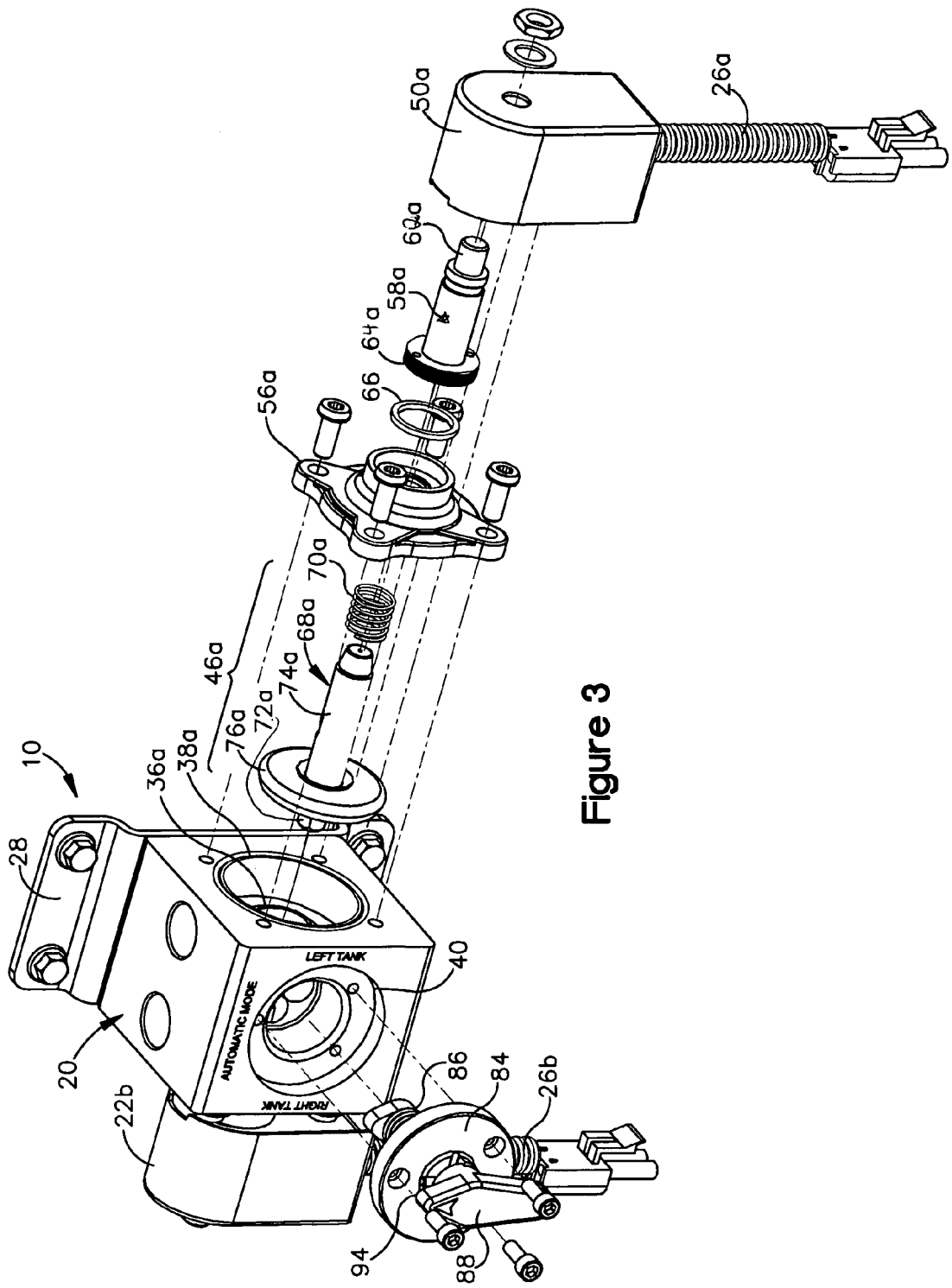
FIG. 3 is a perspective partially-exploded view of the fuel valve assembly 10.
Figure 4:
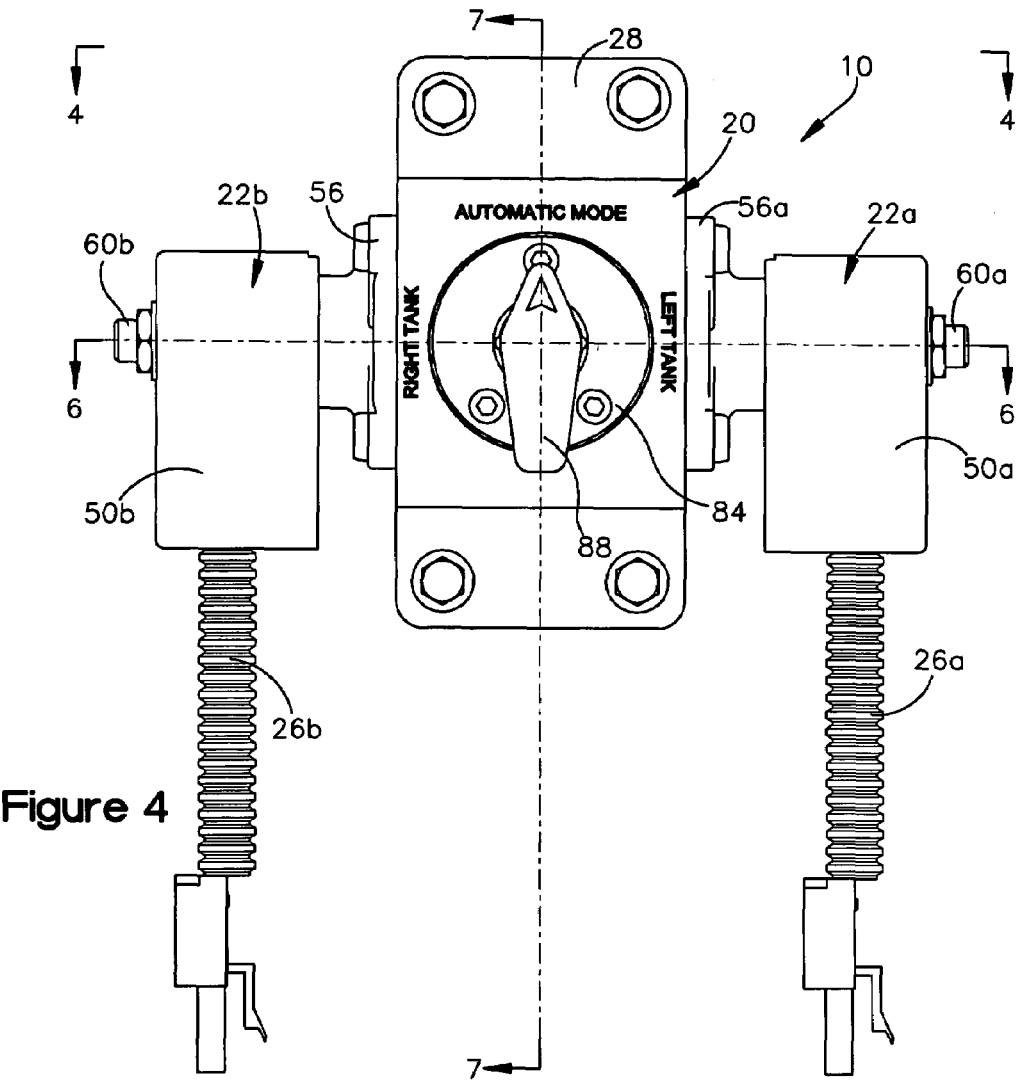
FIGS. 4 and 5 are front and top views, respectively, of the fuel valve assembly 10.
Figure 5:
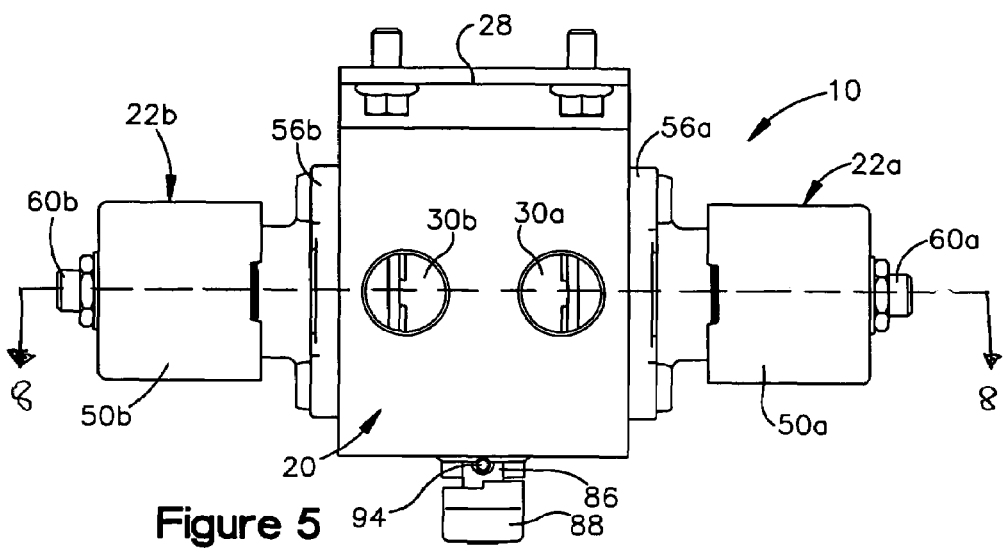
Figure 6:
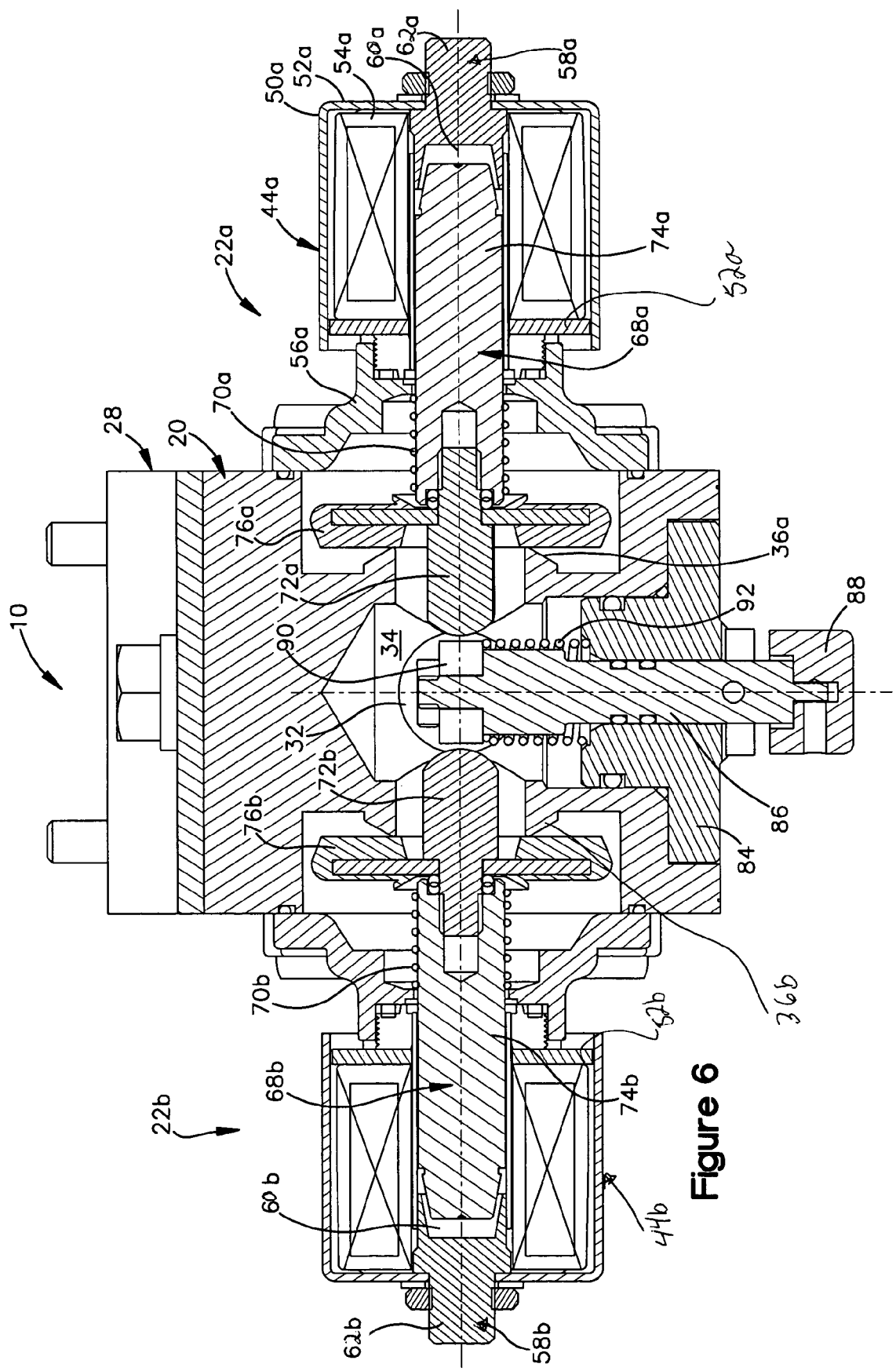
FIG. 6 is a sectional view of the fuel valve assembly 10 as seen along line 6-6 in FIG. 4.
Figure 7:
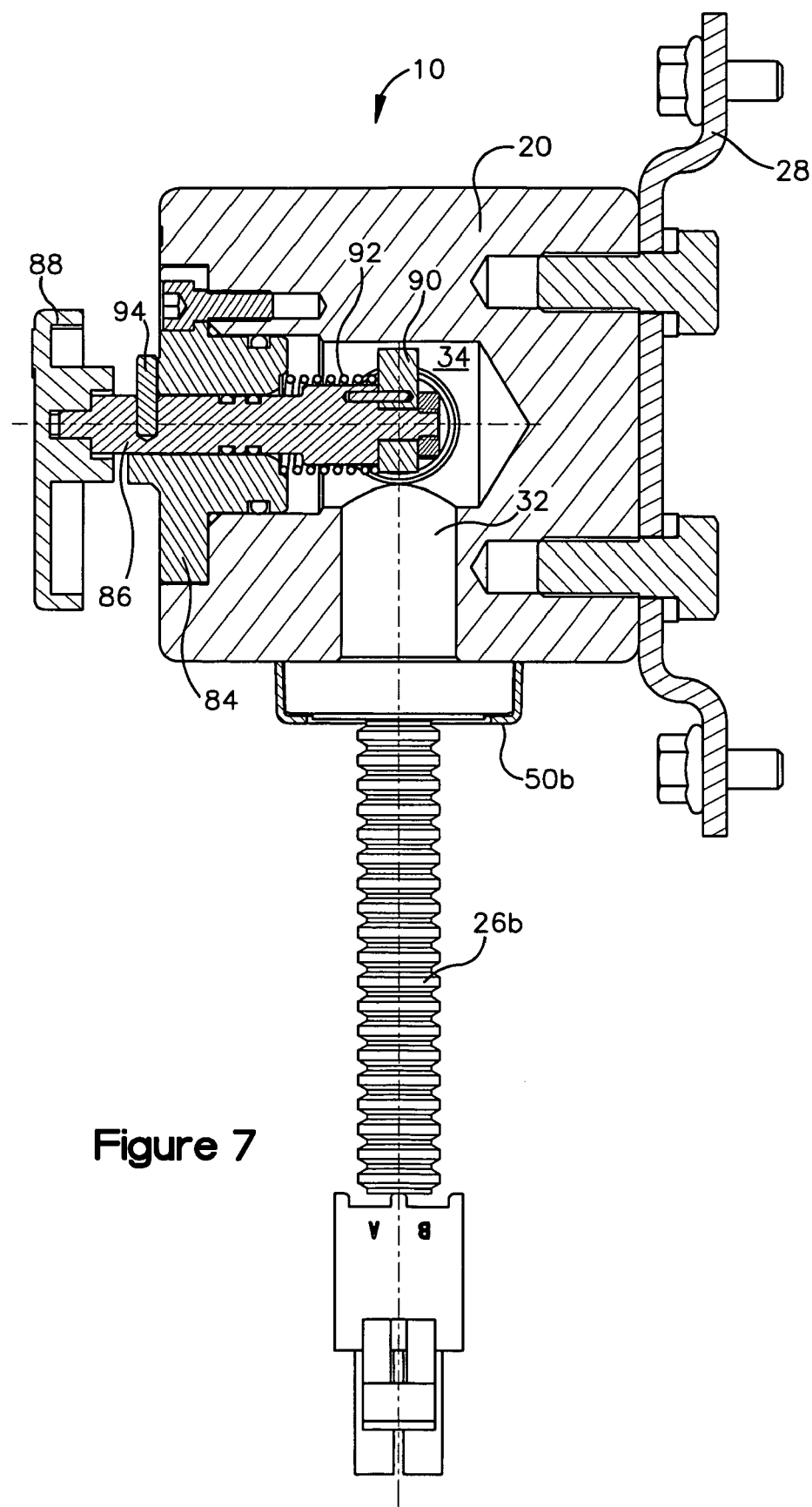
FIG. 7 is a sectional view of the fuel valve assembly 10 as seen along line 7-7 in FIG. 4.
Figure 8:
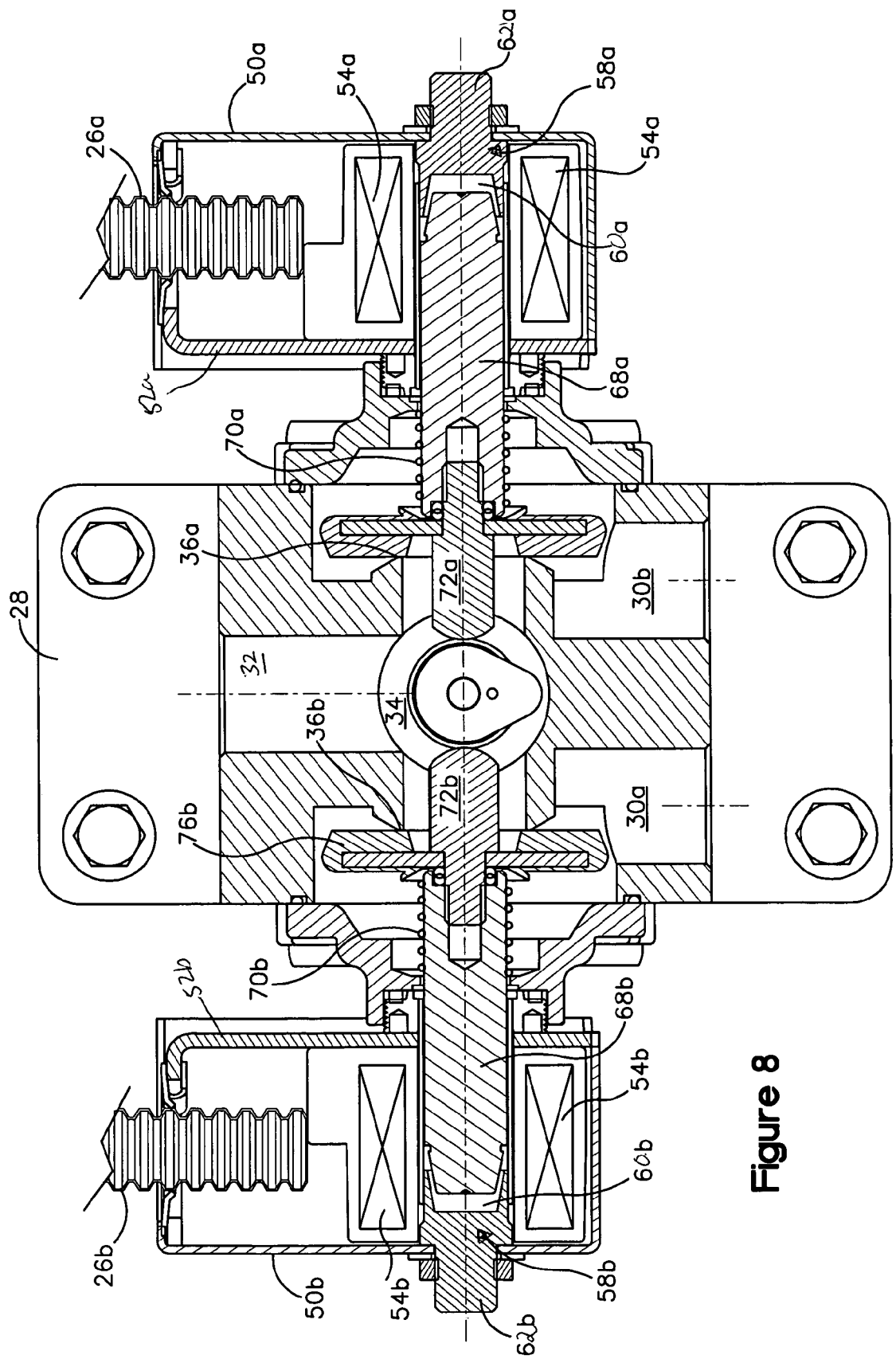
FIG. 8 is a sectional view of the fuel valve assembly 10 as seen along line 8-8 in FIG. 5.

The valve body 20 includes a first fuel supply inlet 30a, a second fuel supply inlet 30b, a fuel supply outlet 32, and a fuel supply chamber 34, which communicates with the common outlet 32. (FIGS. 5, 7, and 8.) A first valve seat 36a defines a passageway between the first inlet 30a and the chamber 34 and a second valve seat 36b defines a passageway between the second inlet 30b and the chamber 34. (FIGS. 3, 6, and 8.) The valve body 20 further includes circular cavities 38a and 38b to accommodate the valves 22a and 22b, respectively, and a cavity 40 to accommodate the manual override device 24. (FIGS. 3, 6, and 8.) Preferably, and as shown, the valve body 20 is a unitary, or formed-in-one-piece, component.

The first valve 22a comprises a fixed solenoid portion 44a and a movable plunger portion 46a. The second valve 22b likewise comprises a fixed solenoid portion 44b and a movable plunger portion 46b. (FIGS. 3 and 6-8.) As is explained in more detail below, the plunger portions 46a/46b move relative to the valve body 20 and the corresponding solenoid portions 44a/44b to open/close the passageways defined by the respective valve seats 36a/36b.

The solenoid portion 44a comprises a housing 50a, a fluxplate 52a, a solenoid coil 54a, a cover 56a and a sleeve 58a. (FIGS. 2-8.) The fluxplate 52a and the coil 54a are contained within the housing 50a and the solenoid coil 54a is electrically connected to the cable 26a. (FIGS. 6-8.) The cover 56a is attached to the valve body 20 around the cavity 38a. (FIGS. 3-6 and 8.) The sleeve 58a includes a plunger-receiving bore 60a which extends through the fluxplate 52a and the coil 54a, a threaded end 62a secured to the housing 50a, and a flanged end 64a attached to the cover 56a. (FIGS. 3 and 6-8.) A seal 66a can be provided to seal the interface between the cover 56a and the sleeve's flanged end 64a. (FIG. 3.)

The movable plunger portion 46a comprises a plunger 68a, a spring 70a, and a cam-engaging projection 72a. (FIGS. 3 and 6.) The plunger 68a includes an armature 74a which is slidably received within the sleeve's bore 64a and around which the spring 70 is positioned. (FIGS. 6 and 8.) The plunger 68a also includes a head 76a which is shaped and located to open/close the passageway defined by the valve seat 36a. (FIGS. 3, 6 and 8.) The spring 70a is linearly confined, between the cover 56a and the sleeve flange 64a, to mechanically bias the plunger 68a towards the chamber 34 and the head 76a towards the valve seat 36a. (FIGS. 6 and 8.) In certain fuel feed systems, fuel pressure might also assist in biasing the plunger 68a in this direction.

The cam-engaging projection 72a extends axially outward from the plunger head 76a and into the chamber 34 of the valve body 20. (FIGS. 6 and 8.) The projection 72a is connected, fixed, or otherwise secured to the plunger cap 76a for movement therewith. For example, in the valve assembly 10, the cap 76a is fixedly secured to the armature 74a and the projection 72a is a separate part having a threaded stem screwed into the plunger armature 74a. Alternatively, and as is discussed below in connection with the valve assembly 110, the projection 72a can be an integral with (i.e., formed in one piece with) the plunger head 76a.

The valve 22b includes the same solenoid and plunger components, although some may not be shown, visible and/or numbered in the drawings. With respect to the illustrated and identified components of the valve 22b, they will have the same reference numeral as their sister components in the valve 22a with the reference numeral being followed by a "b" instead of an "a" suffix. The sister valve components can be assumed to have the same or (where applicable) symmetrical orientation, positioning, construction and/or operation.

The illustrated valves 22a and 22b are normally-closed valves so that they provide a fail safe positive fuel shutoff in the event of loss of electrical power. In the closed condition shown in FIGS. 2-8, the plunger 68a/68b is spring-biased towards the chamber 34 and its seat-sealing head 76a/76b abuts against the adjacent valve seat 36a/36b. This seals the passageway into the chamber 34 whereby the corresponding fuel inlet 30a/30b does not communicate with the fuel outlet 32. In this biased-closed position of the plunger 68a/68b, there is an unoccupied gap at the remote end of the sleeve's plunger-receiving bore 60a/60b. As is explained in more detail below, energization of the solenoid portion 44a/44b causes the plunger 68a/68b to be pulled into the sleeve 58a/58b (to fill the gap) thereby opening the respective passageway to the chamber 34 whereby the corresponding inlet 30a/30b will communicate with the outlet 32.

The manual override device 24 comprises an annular mounting cover 84, a shaft 86, a handle 88, a cam 90 and a spring 92. (FIGS. 2-8.) The mounting cover 84 is secured to the valve body 20 around the cavity 40 and the shaft 86 extends rotatably therethrough. (FIGS. 2, 3, 6 and 7.) The handle 88 is located outside of the valve body 20 and is attached to one end of the shaft 86. (FIGS. 2, 3, 6 and 7.) The use of the manual override device 24 is expected to be, in most applications, an out-of-the-ordinary situation, whereby the handle 88 can be located below a hatch or in the engine compartment.

The cam 90 is located within the valve body 20 and, more particularly, within the chamber 34. (FIGS. 3 and 6-8.) The spring 92 surrounds the shaft 86 and is linearly confined between the cover 84 and the cam 90. (FIGS. 3, 6 and 7.) A pin 94 can be provided on the shaft 86 and three pin-receiving indentations 96 can be provided on the cover 84. (FIGS. 2, 3, 6 and 7.) The biasing spring, the pin 94, and the indentations 96 coordinate to capture the shaft 86, and thus the cam 90, at one of three positions, namely an electrical control (or automatic) position, a first override position, and a second override position. In the electrical control position shown in FIGS. 2-8, the lobe of the cam 90 is located so as to not engage or otherwise interfere with the plunger projections 72a/72b positioned within the chamber 34.

Figure 9A:
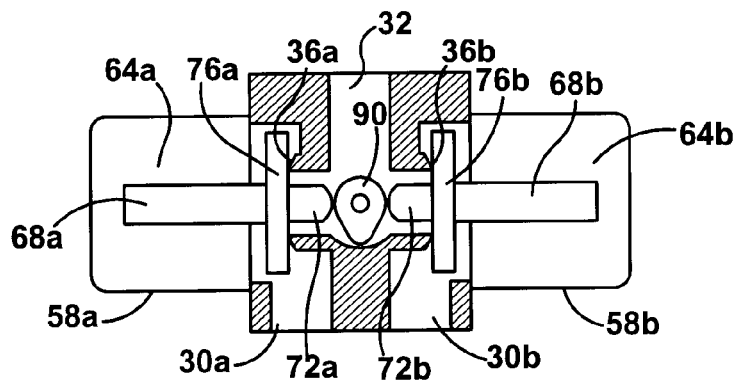
FIGS. 9A-9D are schematic views of key components and corresponding flow paths possible with electrical control of the fuel valve assembly 10.
Figure 9B:
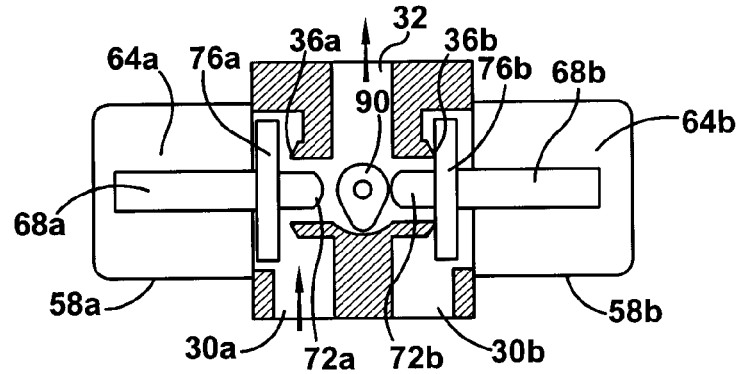
Figure 9C:
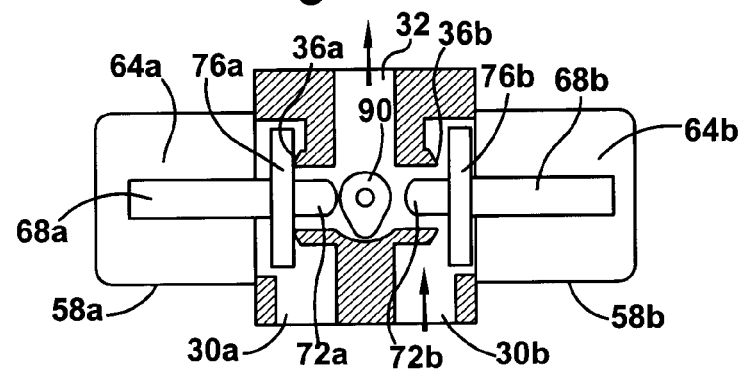
Figure 9D:
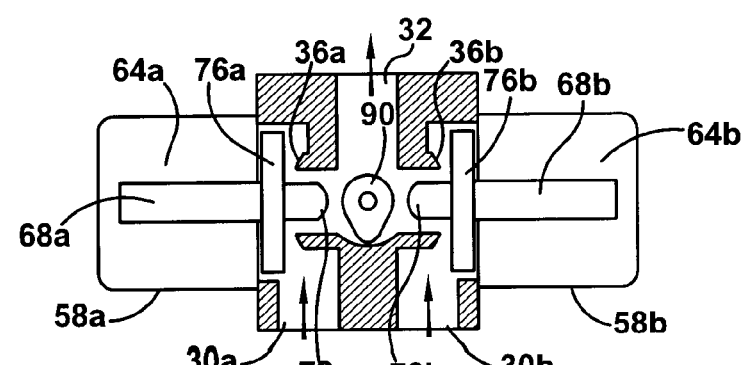

Referring now to FIGS. 9A-9D, the valve assembly 10 is schematically shown when the override device 24 is in the electrical control position. In this mode of operation, both valves 22a/22b can be closed (FIG. 9A), one valve 22a/22b can be open and the other valve 22b/22a closed (FIGS. 9B and 9C), or both valves 22a/22b can be open (FIG. 9D). When both valves 22a/22b are closed, the solenoids 44a/44b are not energized, the plungers 68a/68b are spring biased away from the sleeves 58a/58b, and the plunger heads 76a/76b seal the passageways defined by the valve seats 36a/36b. Thus, the inlets 30a/30b do not communicate with the outlet 32 and no fuel is being supplied to the engine 16 from either of the fuel tanks 14a/14b. (FIG. 9A.)

When the first valve 22a is open, the solenoid 44a is energized, the plunger 68a is pulled into the sleeve 58a and away from the valve seat 36a, the inlet 30a communicates with the outlet 32, and fuel is supplied to the engine 16 from the first fuel tank 14a. (FIGS. 9B and 9D.) Likewise, when the second valve 22b is open, the solenoid portion 44b is energized, the plunger 68b is pulled away from the valve seat 36b, and fuel is supplied to the engine 16 from the second fuel tank 14b. (FIGS. 9C and 9D.) When both the valve 22a and the valve 22b are open, the fuel inlets 30a and 30b will communicate with each other, via the chamber 34, whereby equalization of fuel levels in the tanks 14a/14b, and equalization of fuel supply from the tanks, can be achieved if the tanks are in the same horizontal plane. (FIG. 9D.)

Figure 10A:
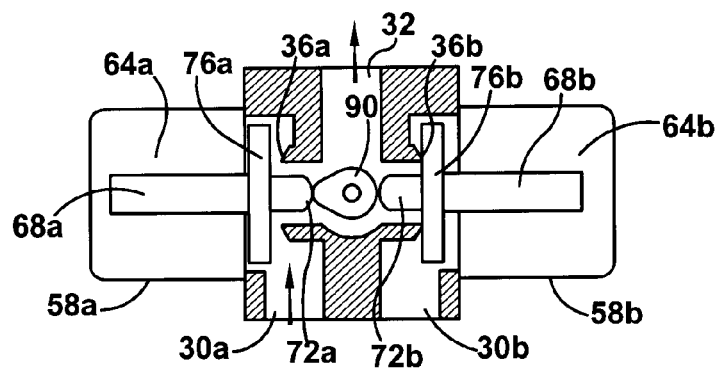
FIGS. 10A-10D are schematic views of key components and corresponding flow paths possible with manual override control of the fuel valve assembly 10.
Figure 10B:
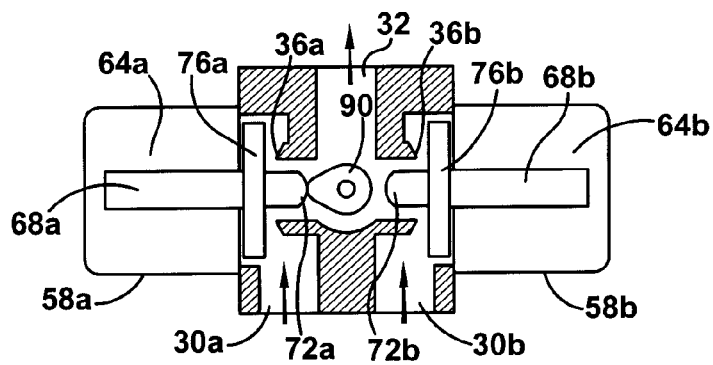
Figure 10C:
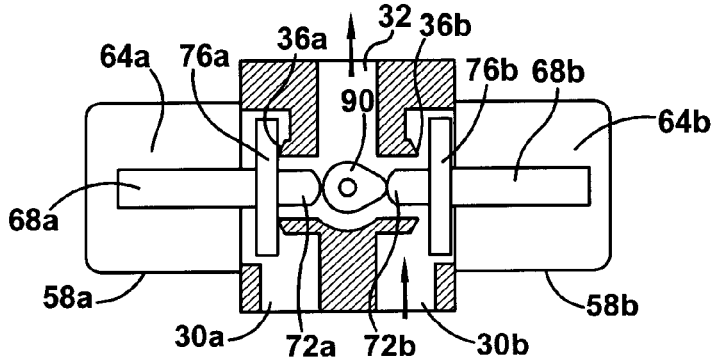
Figure 10D:
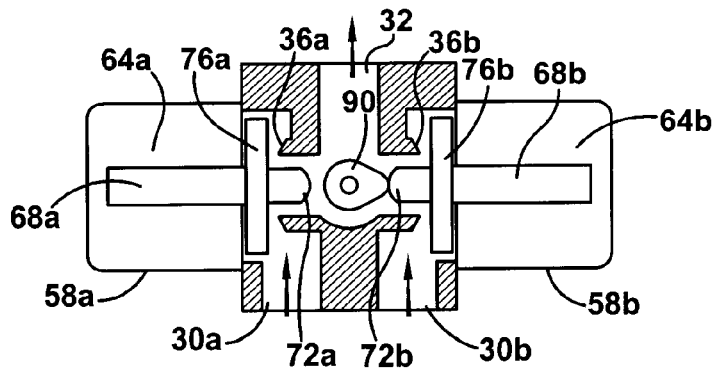

Referring now to FIGS. 10A-10D, the valve assembly 10 is shown when the manual override device 24 is moved from the electrical control (or automatic) position to an override position. In the first override position, the lobe of the cam 90 engages the projection 72a of the first valve 22a and causes the plunger's seat-sealing head 76a to move outward to establish communication between the first fuel inlet 30a and the fuel outlet 32. (FIGS. 10A and 10B.) In the second override position, the lobe of the cam 90 engages the projection 72b of the second valve 22b and causes the plunger's seat-sealing head 76a to move outward to establish communication between the second fuel inlet 30b and the fuel outlet 32. (FIGS. 10C and 10D.) Thus, communication between the fuel outlet 32 and one of the fuel inlets 30a/30b can be established regardless of the electrical state of the corresponding solenoid portion 44a/44b. When the manual override device 24 is in an override position, the other "not-cam-pushed" valve can be closed (FIGS. 10A and 10C) or it can be open via electrical control (FIG. 10B and 10D).

The manual override device 24 allows an equipment (e.g., boat) operator the ability to maintain the flow of fuel if there is a loss of electrical power to either or both of the solenoid portions 44a/44b of the valves 22a/22b. Thus, for example, if the boat 18 experiences a dashboard wiring malfunction while on open waters, the device 24 can be turned to an override position and fuel supplied to the engine 16 to return the boat 18 to shore for repairs. This feature allows the valve assembly 10 to be used when it is necessary to satisfy standards requiring manual emergency bypass of electrically operated fuel supply valves (see e.g., UL 429 Supplement SA standard entitled "Marine Use Electrically Operated Shut-off Valves for Flammable Liquids").

Referring now to FIGS. 11-17, and initially to FIG. 11, another valve assembly 110 according to the present invention is shown. The valve assembly 110 can be part of two-tank fuel feed system 112 for a boat 118. The fuel feed system 112 can be similar to the system 12, except that a percentage of the fuel supplied to the engine 116 (or other fuel-consuming device) is returned to the first fuel tank 114a and/or the second fuel tank 114b.

The valve assembly 110 includes fuel supply and some override components that are the same as the corresponding components in the valve assembly 10. In the drawings and the description, like reference numerals are used to designate these corresponding components. Unless a difference is specifically described, the same-numbered components of the valve assembly 110 should be assumed to have the same orientation, positioning, construction and/or operation as the corresponding components of the valve assembly 10.

Figure 12:
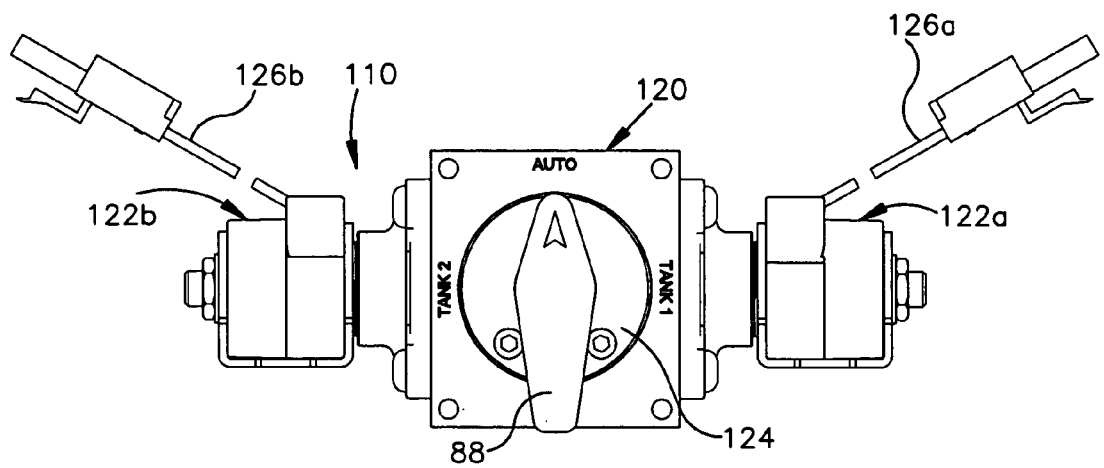
Figure 13:
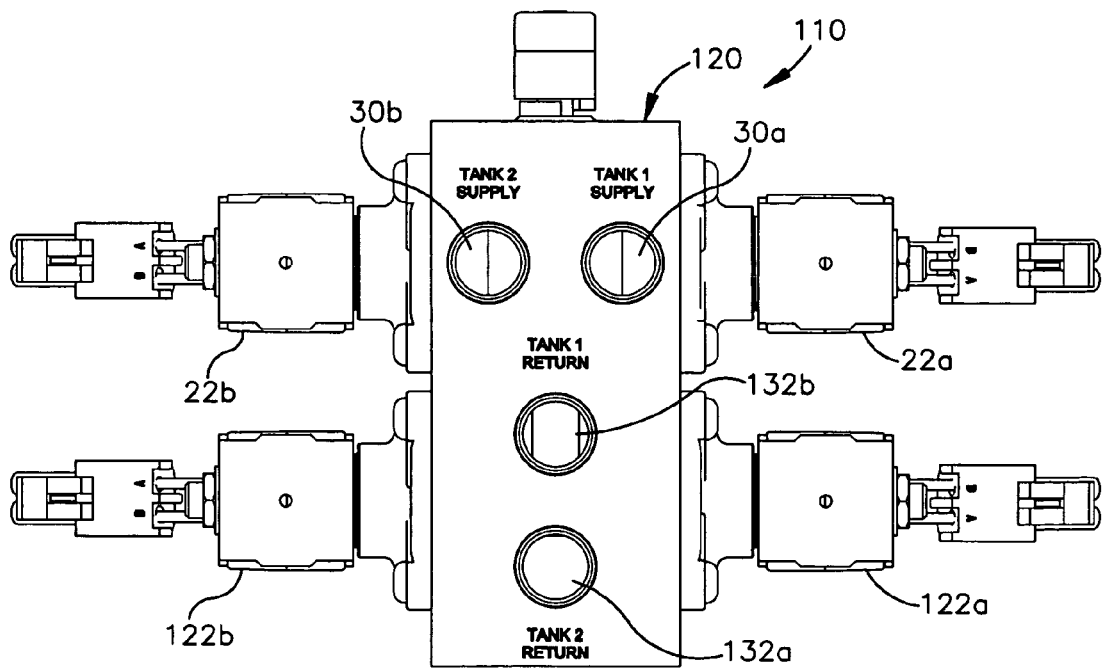

The fuel valve assembly 110 includes a valve body 120 having fuel supply inlets 30a/30b, a fuel supply outlet 32, a supply chamber 34, and valve seats 36a/36b. (FIGS. 12, 13 and 16.) The valve body 120 further includes a return inlet 130, return outlets 132a and 132b, a return chamber 134, and valve seats 136a/136b. (FIGS. 12, 13 and 16.) The supply chamber 34 and the return chamber 134 are isolated, or sealed, from each other in the valve body 120. (FIG. 16.) Preferably, and as shown, the valve body 120 is a unitary, or formed-in-one-piece, component.

In the fuel feed system 112, the inlets 30a/30b would be connected to supply lines from the fuel tanks 114a/114b and the outlet 32 would be connected to a supply line to the fuel-consuming device 116. The return inlet 130 would be connected to a return line from the fuel-consuming device 116 and the return outlets 132a/132b would be connected to return lines to the fuel tanks 114a/114b.

The valve assembly 110 includes a first inlet valve 22a and a second inlet valve 22b. (FIGS. 12, 13 and 16.) The valves 22 have plunger portions 46 wherein the projections 72 are formed in one piece with the seat-sealing surfaces 76. (FIGS. 15 and 16.) The illustrated one-piece construction may be more tolerant of seat-seal misalignment and/or may reduce power requirements. That being said, the separate-part projections 72 used in the valve assembly 10 could be used instead in the valve assembly 110.

The valve assembly 110 further includes a first return valve 122a and a second return valve 122b. (FIGS. 12, 13, 15 and 16.) The return valves 122 can have essentially the same construction as the inlet valves 22 whereby like references numerals, incremented by 100, are used. Electrical control of the valve assembly 110 is the same as that of the valve assembly 10, with both the supply valves 22 and the return valves 122 preferably being normally closed valves.

The manual override device 124 is essentially the same as the override device 24 except that its shaft 186 is longer and extends through the chamber 34 into the chamber 134. (FIG. 16.) The cam 90 is mounted on an intermediate region of the shaft 186 so that it is positioned within the chamber 34 and another cam 190 is mounted on the end of the shaft 186 so that it is positioned within the chamber 134. (FIGS. 15 and 16.) The cams 90 and 190 are geometrically aligned and are rotated together with the shaft 186. In the electrical control (or automatic) setting shown in the drawings, the cams 90 and 190 are each oriented so that their lobes do not engage or otherwise interfere with the plunger-projections 72 and 172 within the chambers 34 and 134, respectively. When the override device 124 is manually moved to an override position, both cams 90/190 will push the corresponding plunger 68/168 to an open position regardless of the electrical state of the solenoid portion 44/144.

One may now appreciate that the present invention provides a valve assembly 10/110 that can be used to electrically control fuel flow in a two-tank fuel supply system 12/112. The valve assembly 10/110 can incorporate normally-closed valves 22/122 to provide a fail safe positive fuel shutoff in the event of a loss of electrical power and it can accommodate a manual override device 24/124 to maintain fuel flow in spite of, or in the absence of, electrical control.

Although the invention has been shown and described with respect to certain preferred embodiments, it is obvious that equivalent and obvious alterations and modifications will occur to others skilled in the art upon the reading and understanding of this specification. For example, the valve assembly can be modified to accommodate more than two fuel tanks (e.g., three, four, five, etc.). Additionally or alternatively, the supply outlet can supply fuel to, and/or the return inlet can return fuel from, more than one fuel-consuming device (e.g., twin engines). Moreover, a plunger design wherein the seat-sealing surface is slidably mounted to the rest of the plunger for override movement is certainly possible with, and contemplated by, the present invention. The present invention includes all such alterations and modifications and is limited only by the scope of the following claims.

The invention claimed is:

1. A valve assembly comprising:
    a valve body having a first supply inlet, a second supply inlet, and a supply outlet;
    a first supply valve including a first supply plunger which is electrically movable between a position whereat the first supply inlet communicates with the supply outlet and a position whereat the first supply inlet is sealed from the supply outlet;
    a second supply valve including a second supply plunger which is electrically movable between a position whereat the second supply inlet communicates with the supply outlet and a position whereat the second supply inlet is sealed from the supply outlet; and
    an override device manually movable to a first override position, whereat the first supply inlet communicates with the supply outlet, and to a second override position, whereat the second supply inlet communicates with the supply outlet;
    wherein the valve body additionally comprises a return inlet, a first return outlet, and a second return outlet;
    wherein the valve assembly additionally comprises a first return valve comprising a first return plunger which is electrically movable between a position whereat the first return outlet communicates with the return inlet and a position whereat the first return outlet is sealed from the return inlet, and a second return valve comprising a second return plunger which is electrically movable between a position whereat the second return outlet communicates with the return inlet and a position whereat the second return outlet is sealed from the return inlet; and
    wherein, when the override device is in the first override position, the first return outlet communicates with the return inlet and, when, the override device is in the second override position, the second return outlet communicates with the return inlet.

2. A valve assembly as set forth in claim 1, wherein the valve body further comprises an supply chamber which communicates with the supply outlet and a return chamber which communicates with the return inlet, and wherein the supply chamber is sealed from return chamber.

3. A valve assembly as set forth in claim 2, wherein the override device comprises a shaft, a cam attached to the shaft and positioned in the supply chamber, and another cam also attached to the shaft and positioned in the return chamber.

4. In combination, the valve assembly of claim 1, a first fuel tank, a second fuel tank, and a fuel-consuming device; wherein:
    the first supply inlet is connected to an supply line from the first fuel tank and the second supply inlet is connected to an supply line from the second fuel tank;
    the supply outlet is connected to an supply line to the fuel-consuming device;
    the return inlet is connected to a return line from the fuel-consuming device; and
    the first return outlet is connected to a return line to the first fuel tank and the second return outlet is connected to a return line to the second fuel tank.

5. The combination set forth in claim 4, wherein the fuel-consuming device is a propulsion engine for a boat.

6. In combination, a boat comprising a hull, the valve assembly of claim 1, a first fuel tank, a second fuel tank, and a fuel-consuming device;
    wherein the first supply inlet is connected to an supply line from the first fuel tank and the second supply inlet is connected to an supply line from the second fuel tank;
    wherein the supply outlet is connected to an supply line to the fuel-consuming device;
    wherein the return inlet is connected to a return line from the fuel-consuming device; and
    wherein the first return outlet is connected to a return line to the first fuel tank and the second return outlet is connected to a return line to the second fuel tank; and
    wherein the first and second fuel tanks are substantially symmetrically located relative to a longitudinal axis of the hull.

* * * * *